(12) United States Patent
Suzuki

(10) Patent No.: US 12,022,219 B2
(45) Date of Patent: Jun. 25, 2024

(54) IMAGE SENSOR AND SIGNAL CONVERSION METHOD

(71) Applicant: SK hynix Inc., Icheon-si (KR)

(72) Inventor: Hajime Suzuki, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/189,154

(22) Filed: Mar. 23, 2023

(65) Prior Publication Data

US 2024/0147095 A1    May 2, 2024

(30) Foreign Application Priority Data

Nov. 2, 2022  (KR) .................. 10-2022-0144269

(51) Int. Cl.
*H04N 25/75* (2023.01)
*H04N 25/773* (2023.01)
*H04N 25/778* (2023.01)

(52) U.S. Cl.
CPC ........... *H04N 25/75* (2023.01); *H04N 25/773* (2023.01); *H04N 25/778* (2023.01)

(58) Field of Classification Search
CPC .............................. H04N 25/75; H04N 25/778
See application file for complete search history.

(56) References Cited

U.S. PATENT DOCUMENTS

| | | | |
|---|---|---|---|
| 10,615,190 B2 | 4/2020 | Ebihara | |
| 2021/0250530 A1 | 8/2021 | Paik et al. | |
| 2022/0078362 A1* | 3/2022 | Jung | ............ H04N 25/75 |

FOREIGN PATENT DOCUMENTS

KR    102209660 B1    1/2021

* cited by examiner

*Primary Examiner* — Thanh Luu
(74) *Attorney, Agent, or Firm* — William Park & Associates Ltd.

(57) ABSTRACT

Provided herein may be an image sensor and a signal conversion method. A signal transducer for converting an analog pixel signal into a digital signal may include an operational amplifier configured to receive a pixel signal, a conversion gain of which is changed, through a first input terminal, receive a ramp signal through a second input terminal, and change polarities of the first input terminal and the second input terminal based on an inverse signal, and a signal manager configured to generate the inverse signal in response to a change in the conversion gain and transfer the inverse signal to the operational amplifier.

28 Claims, 10 Drawing Sheets

IMAGE SENSOR AND SIGNAL CONVERSION METHOD

CROSS-REFERENCE TO RELATED APPLICATION

The present application claims priority under 35 U.S.C. § 119(a) to Korean patent application number 10-2022-0144269, filed on Nov. 2, 2022, in the Korean Intellectual Property Office, the entire disclosure of which is incorporated herein by reference.

BACKGROUND

1. Technical Field

Various embodiments of the present disclosure relate to an image sensor, and more particularly to an image sensor and an analog-to-digital conversion method.

2. Related Art

Generally, image sensors may be classified into the following: a charge coupled device (CCD) image sensor and a complementary metal oxide semiconductor (CMOS) image sensor. Recently, the CMOS image sensor has attracted attention due to its low manufacturing cost, low power consumption, and ability to facilitate integration with a peripheral circuit.

An image sensor may convert an analog signal that is output from a pixel into a digital signal. The image sensor may convert a pixel signal into a digital signal by using a low conversion gain in order to prevent saturation of the pixel. Meanwhile, the image sensor may convert a pixel signal into a digital signal by using a high conversion gain in order to respond to a low-illuminance situation.

When a pixel signal is converted, offset voltages respectively corresponding to a low conversion gain and a high conversion gain may be different from each other. There is a need to devise an image sensor that is capable of converting a pixel signal into a digital signal even if the conversion gain of the pixel signal changes.

SUMMARY

An embodiment of the present disclosure may provide for a signal transducer. The signal transducer may include an operational amplifier configured to receive a pixel signal, a conversion gain of which is changed, through a first input terminal, receive a ramp signal through a second input terminal, and change polarities of the first input terminal and the second input terminal based on an inverse signal, and a signal manager configured to generate the inverse signal in response to a change in the conversion gain and transfer the inverse signal to the operational amplifier.

An embodiment of the present disclosure may provide for an image sensor. The image sensor may include pixels configured to output pixel signals corresponding to a first conversion gain or a second conversion gain, a signal transducer configured to convert each of the pixel signals into a digital signal based on a ramp signal used for signal conversion, and a control circuit configured to generate the ramp signal, wherein the signal transducer receives the pixel signal through a first input terminal, receives the ramp signal through a second input terminal, and changes polarities of the first input terminal and the second input terminal based on an inverse signal, and wherein the control circuit generates the inverse signal in response to a change in a conversion gain of the pixel signal from the first conversion gain to the second conversion gain, and transfers the inverse signal to an operational amplifier included in the signal transducer.

An embodiment of the present disclosure may provide for a signal conversion method. The signal conversion method may include receiving a pixel signal, a conversion gain of which is changed to a first conversion gain or a second conversion, and a ramp signal used for signal conversion, setting polarities of a first input terminal configured to receive the pixel signal based on the conversion gain of the pixel signal and a second input terminal configured to receive the ramp signal, storing an offset voltage determined based on the conversion gain of the pixel signal in capacitors coupled to the second input terminal, and converting the pixel signal into a digital signal based on the offset voltage.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure will now be described more fully hereinafter with reference to the accompanying drawings, in which preferred embodiments of the present disclosure are shown, so that those skilled in the art can easily practice the technical spirit of the present disclosure.

Various embodiments of the present disclosure are directed to an image sensor and a signal conversion method, which change the polarities of an operational amplifier in response to a change in a conversion gain corresponding to a pixel signal and then store an offset voltage.

Figure 1:
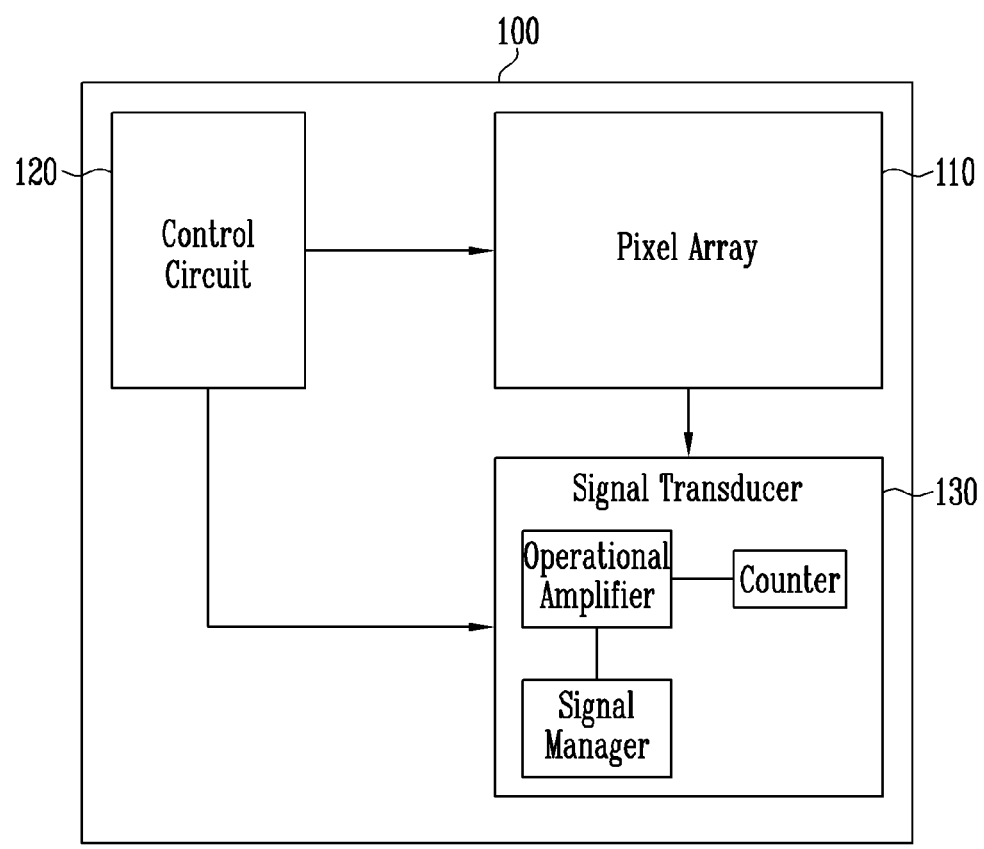
FIG. 1 is a diagram illustrating an image sensor according to an embodiment of the present disclosure.

FIG. 1 is a diagram illustrating an image sensor according to an embodiment of the present disclosure.

Referring to FIG. 1, an image sensor 100 may include a pixel array 110, a control circuit 120, and a signal transducer 130.

The pixel array 110 may include a plurality of pixels for outputting information included in incident light. In detail, the plurality of pixels may accumulate photocharges generated based on the incident light and may generate pixel signals corresponding to the accumulated photocharges. Each of the generated pixel signals may be an analog pixel signal.

The control circuit 120 may generate control signals for controlling the image sensor 100. The control circuit 120 may control the operations of the pixel array 110 and the signal transducer 130 that are included in the image sensor 100 by outputting the generated control signal. The control circuit 120 may generate a ramp signal that is used for signal conversion and may transfer the ramp signal to the signal transducer 130.

The signal transducer 130 may convert an analog pixel signal into a digital pixel value. The digital pixel value may be output in various patterns. The signal transducer 130 may perform correlated double sampling (CDS) on each of the signals output from the pixel array 110 in response to control signals output from the control circuit 120 and may output respective digital signals by performing analog-to-digital conversion on correlated double sampled signals.

In an embodiment of the present disclosure, the signal transducer 130 may include an operational amplifier, a counter, and a signal manager. The operational amplifier may generate a comparison signal by comparing the pixel signals with the ramp signal. The counter may generate a conversion value, obtained by converting each pixel signal into a digital signal based on the comparison signal that is received from the operational amplifier, and a clock signal. For example, the counter may count the number of clocks received during a time in which the comparison signal is maintained at a high value or at a low value. The counter may output a digital signal generated based on the counted number of clocks. The signal manager may generate control signals that are used to convert an analog signal into a digital signal.

The signal transducer 130 may output a digital signal corresponding to the amount of charge in each pixel. Hereinafter, the output of the signal transducer 130 may be a digital signal generated by the counter counting the output signal of the operational amplifier.

Figure 2:
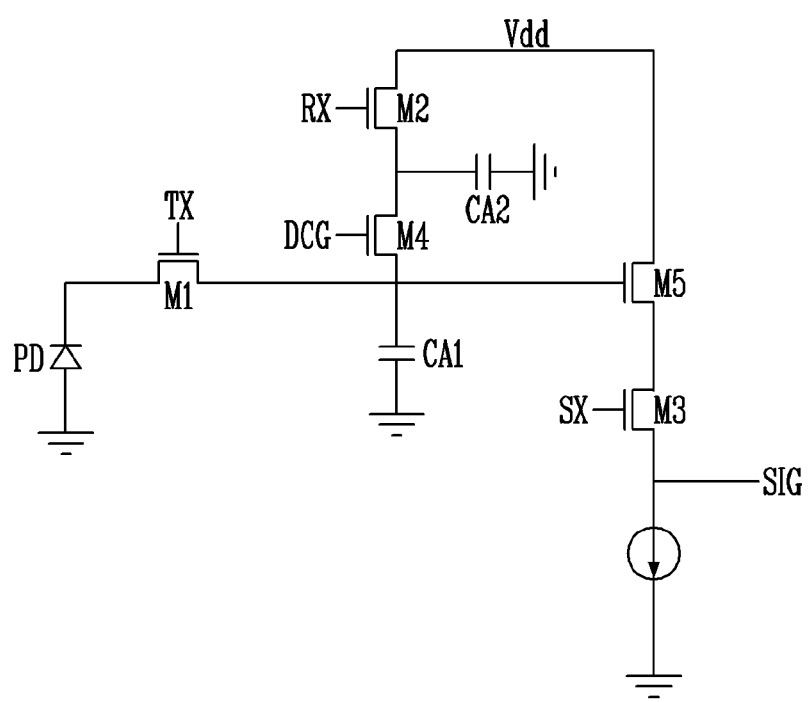
FIG. 2 is a circuit diagram illustrating a pixel according to an embodiment of the present disclosure.

FIG. 2 is a circuit diagram illustrating a pixel according to an embodiment of the present disclosure.

Referring to FIG. 2, the pixel included in a pixel array may be illustrated. The pixel may change a conversion gain based on the amount of incident light. The pixel may change the conversion gain and then may be prevented from being saturated.

Referring to FIG. 2, the pixel may include a photodetector PD, a plurality of MOS transistors, and a plurality of capacitors. An operating voltage Vdd may be applied to the pixel. The plurality of MOS transistors may include a transfer transistor M1, a reset transistor M2, a select transistor M3, a change transistor M4, and an input transistor M5. The plurality of capacitors may include a first storage capacitor CA1 and a second storage capacitor CA2 that store charges transferred to a floating diffusion node coupled to a gate of the input transistor M5.

The photodetector PD may perform a photoelectric conversion function. One terminal of the photodetector PD may be coupled to a ground. The photodetector PD may receive light from an external system and may generate photocharges based on the received light. In an embodiment of the present disclosure, the photodetector PD may be a photodiode, a phototransistor, a photogate, or a pinned photodiode.

The transfer transistor M1 may transfer the photocharges generated by the photodetector PD to the floating diffusion node in response to a transmission signal TX. The transferred photocharges may be stored in the first storage capacitor CA1 and the second capacitor CA2.

The reset transistor M2 may reset the photocharges accumulated in the floating diffusion node in response to a reset signal RX. The reset transistor M2 may reset the first storage capacitor CA1 and the second storage capacitor CA2 by applying a fixed voltage.

The select transistor M3 may output an output signal SIG (i.e., pixel signal) in response to a selection signal SX. The output signal SIG may be a gate voltage of the input transistor M5. The gate voltage of the input transistor M5 may be determined based on the floating diffusion node. In an embodiment of the present disclosure, a first end of the select transistor M3 may be coupled to a first end of the input transistor M5, and a second end of the select transistor M3 may be coupled to a current source.

The change transistor M4 may change the capacitance value of the capacitors coupled to the floating diffusion node in response to a change signal DCG. The change transistor M4 may function as a switch. When both the first storage capacitor CA1 and the second storage capacitor CA2 are coupled to the floating diffusion node through the change transistor M4, the capacitance value may be increased. With the increase in the capacitance value, the conversion gain of the pixel may be decreased. The conversion gain at that time may be regarded as a 'low conversion gain.'

The pixel may select a low conversion gain in response to the large amount of incident light. As the amount of incident light increases, the number of photocharges generated by the photodetector PD may increase. Because the photocharges may be stored in the first storage capacitor CA1 and the second storage capacitor CA2, the pixel may be prevented from being saturated.

When the change transistor M4 is open, the second storage capacitor CA2 may be disconnected from the floating diffusion node, and photocharges may be stored only in the first storage capacitor CA1. In response to the low amount of incident light, the capacitance value may be decreased. When the capacitance value is low, the conversion gain may be regarded as a high conversion gain. In an embodiment, based on the high conversion gain, even in a low-illuminance environment, which is an environment in which the amount of incident light is low, the output signal SIG may be maintained at a high voltage compared to noise.

In an embodiment of the present disclosure, the output signal SIG of the pixel may correspond to a high conversion gain or a low conversion gain. When the pixel is saturated and corresponds to a high conversion gain, the change transistor M4 may prevent the pixel from being saturated by coupling the second storage capacitor CA2 to the floating diffusion node.

In an embodiment of the present disclosure, the control signals applied to the plurality of transistors may be generated by the control circuit. The control signals generated by the control circuit may be transferred to the signal manager.

Figure 3:
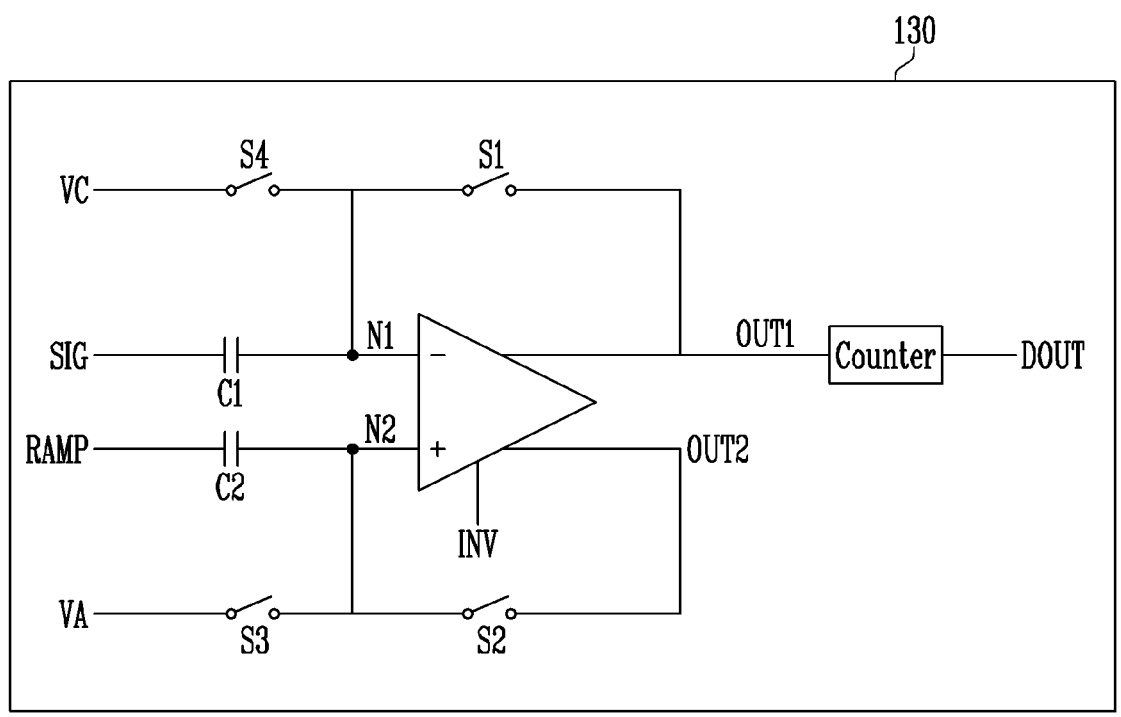
FIG. 3 is a circuit diagram illustrating a signal transducer according to the embodiment of the present disclosure.

FIG. 3 is a circuit diagram illustrating a signal transducer according to the embodiment of the present disclosure.

Referring to FIG. 3, the signal transducer 130 may receive a pixel signal and a ramp signal, convert the pixel signal into a digital signal, and output the digital signal. The signal transducer 130 may include an operational amplifier, a counter, capacitors, and switches.

The operational amplifier may compare signals received through a first input terminal N1 with signals received through a second input terminal N2 and then may output a result signal through a first output terminal OUT1 or a second output terminal OUT2. The counter may convert the signal, received from the first output terminal OUT1 of the operational amplifier, into a digital signal. The signal transducer 130 may convert the output signal SIG of the pixel, which is an analog signal, into a digital signal and then may output the digital signal. The output of the signal transducer 130 may be output through a terminal DOUT.

In an embodiment of the present disclosure, the first input terminal N1 may be coupled to the first output terminal OUT1 through a first switch S1. The first output terminal OUT1 may output a pixel value obtained by converting the pixel signal into a digital signal. The first input terminal N1 may receive the output signal (pixel signal) SIG through a first capacitor C1. The first input terminal N1 may be coupled to a source of a fixed voltage VC through a fourth switch S4. In an embodiment of the present disclosure, the fixed voltage VC may be identical to a ramp signal RAMP.

The second input terminal N2 may be coupled to the second output terminal OUT2 through a second switch S2. The second input terminal N2 may receive the ramp signal through the second capacitor C2. The second input terminal N2 may receive a constant voltage VA through a third switch S3.

The operational amplifier may receive the pixel signal SIG, the conversion gain of which has changed, through the first input terminal N1. The operational amplifier may receive the ramp signal RAMP to be used for signal conversion through the second input terminal N2. The operational amplifier may change the polarities of the first input terminal N1 and the second input terminal N2 based on an inverse signal INV.

Although not illustrated in FIG. 3, the signal transducer 130 may include a signal manager that generates control signals to be applied to the operational amplifier and the switches. In an embodiment of the present disclosure, the signal manager may generate the inverse signal INV in response to a change in the conversion gain of the pixel signal SIG. The signal manager may transfer the inverse signal INV to the operational amplifier. The signal manager may receive a signal, indicating whether the conversion gain of the pixel signal SIG is a low conversion gain or a high conversion gain, from the control circuit. The signal manager may generate the inverse signal INV and the control signals to be applied to the switches based on the signals received from the control circuit.

In an embodiment of the present disclosure, the control signals to be applied to the operational amplifier and the switches may be generated by the control circuit. The control circuit may generate the inverse signal INV in response to the change in the conversion gain of the pixel signal SIG generated in the pixel array. The control circuit may transfer the generated inverse signal INV to the operational amplifier.

In an embodiment of the present disclosure, in response to the inverse signal INV corresponding to a low state, the operational amplifier may set the first input terminal N1 to a negative terminal and set the second input terminal N2 to a positive terminal. In response to the inverse signal INV corresponding to a low state, the operational amplifier may output a signal to the first output terminal OUT1.

On the other hand, in response to the inverse signal INV corresponding to a high state, the operational amplifier may set the first input terminal N1 to a positive terminal and set the second input terminal N2 to a negative terminal. In response to the inverse signal INV corresponding to a high state, the operational amplifier may output a signal to the second output terminal OUT2.

In an embodiment, the fourth switch S4 may always be maintained in an open state. The first capacitor C1 may store the voltage of the first input terminal N1. The second capacitor C2 may store the voltage of the second input terminal N2. The signal manager may generate a reset signal for operating the first switch S1 and the third switch S3. When the first switch S1 and the third switch S3 are in a closed state, the first capacitor C1 may store an offset voltage corresponding to the ramp signal RAMP.

In an embodiment of the present disclosure, the conversion gain of the pixel signal SIG may be changed. When the conversion gain of the pixel signal SIG is changed from a low conversion gain to a high conversion gain, the voltage of the pixel signal SIG may be decreased. The voltage of the first input terminal N1 may drop based on the voltage of the pixel signal SIG. Even if the voltage of the first input terminal N1 is changed, the voltages of the second input terminal N2 and the capacitor C2 may be maintained at the same voltage. Such a scenario may lead to a decrease in the accuracy of the signal transducer 130 that converts the pixel signal SIG into a digital signal. To prevent this, the voltage of the second capacitor C2 may be required to change based on the conversion gain of the pixel signal SIG.

The signal manager may generate a drop signal for controlling the inverse signal INV and the second switch S2 in response to an increase in the conversion gain of the pixel signal SIG. In response to the change in the conversion gain of the pixel signal SIG from a low conversion gain to a high conversion gain, the signal manager may change the inverse signal INV to a high state and may operate the second switch.

The operational amplifier may change the polarities of the first input terminal N1 and the second input terminal N2 in response to the inverse signal INV corresponding to a high state and may output the signal to the second output terminal OUT2. The output of the operational amplifier may be fed back into the second input terminal N2 through the second switch S2. Here, the output of the operational amplifier may be equal to the voltage of the first input terminal N1. The second capacitor C2 may store the output of the operational amplifier that is fed back. The second capacitor C2 may store the dropped voltage of the first input terminal N1.

The signal manager may open the second switch S2 in response to a case in which the voltage of the second input terminal N2 becomes equal to the voltage of the first input terminal N1. The signal manager may change the inverse signal INV to a low state when a certain time period has elapsed from a time point at which the second switch S2 is open. When the inverse signal INV makes a transition to a low state, the operational amplifier may re-change the polarities of the first input terminal N1 and the second input terminal N2. The operational amplifier may output a signal to the counter only when the inverse signal INV is in a low state. The signal transducer 130 may output a pixel value obtained by converting the pixel signal SIG into a digital signal only when the inverse signal INV is in a low state.

Figure 4:
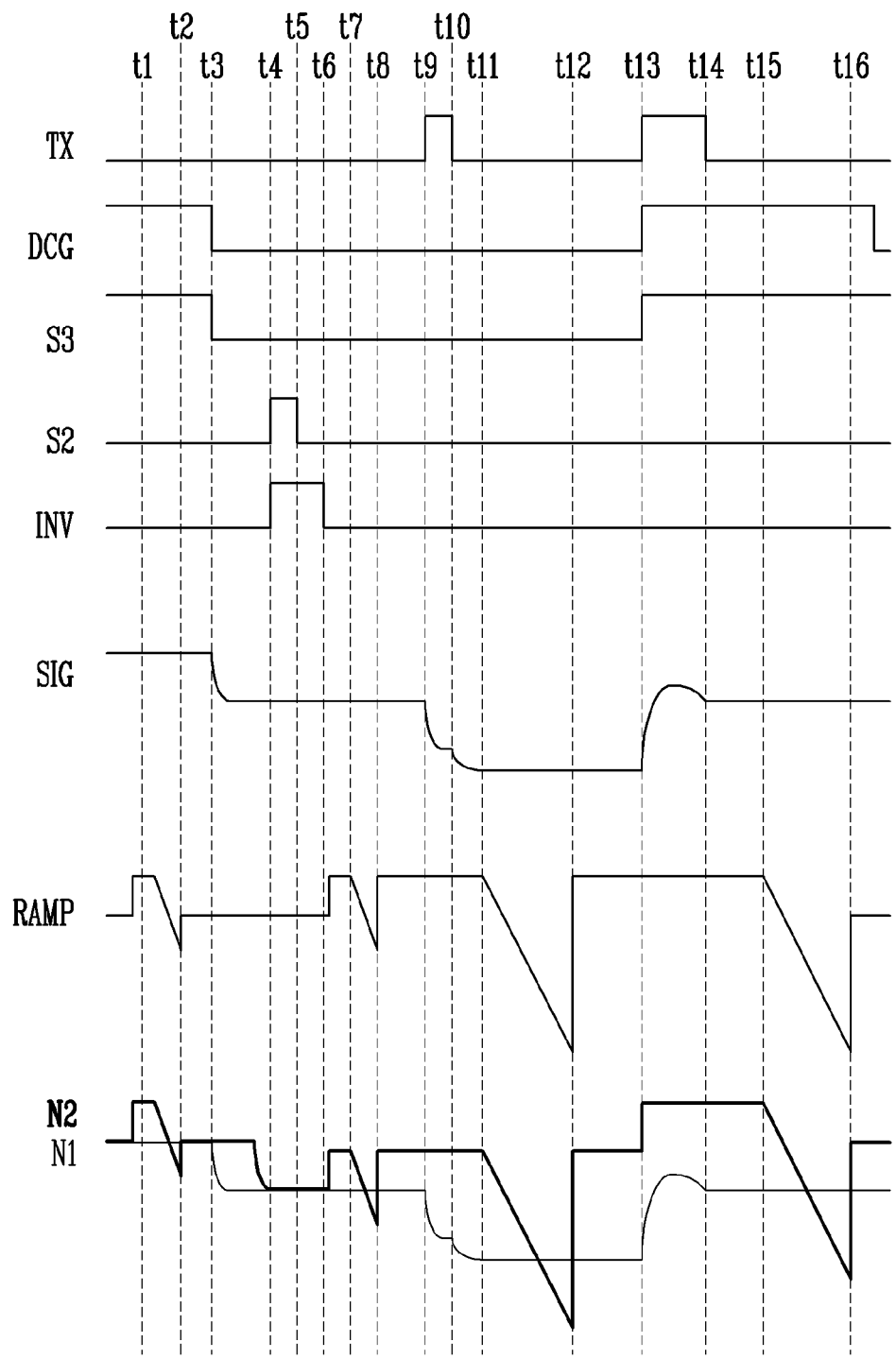
FIG. 4 is a timing diagram illustrating a signal conversion process according to an embodiment of the present disclosure.

FIG. 4 is a timing diagram illustrating a signal conversion process according to an embodiment of the present disclosure.

Referring to FIG. 4, the operational amplifier may convert a pixel signal into a digital signal based on a ramp signal. FIG. 4 illustrates control signals applied to the signal transducer 130 of FIG. 3, the pixel signal SIG, the ramp signal RAMP, the voltage of the first input terminal N1, and the voltage of the second input terminal N2. In FIG. 4, it may be assumed that, before time point t1, the operational amplifier is reset. The first capacitor C1 may store an offset voltage corresponding to the ramp signal RAMP.

Because the change signal DCG is in a high state before time point t1, the conversion gain of the pixel signal SIG may be a low conversion gain. Since the inverse signal INV is in a low state, the first input terminal N1 may be a negative terminal, and the second input terminal N2 may be a positive terminal.

The voltage of the first input terminal N1 may be determined by the pixel signal SIG and a voltage stored in the first capacitor C1. Similarly, the voltage of the second input terminal N2 may be determined by the ramp signal RAMP and a voltage stored in the second capacitor C2.

The ramp signal RAMP may have a first ramp waveform from time point t1 to time point t2. The first ramp waveform may be a ramp waveform corresponding to the reset signal of the pixel signal SIG. The counter may convert the pixel signal SIG corresponding to a low conversion gain into a first conversion value by quantizing the pixel signal SIG from time point t1 to time point t2 based on the output of the operational amplifier. The first conversion value may be a digital signal obtained by converting a reset signal having a low conversion gain. The signal transducer 130 may convert the pixel signal SIG into the first conversion value based on the first ramp waveform.

The ramp signal RAMP may be maintained at an initial level from time point t2 to time point t6. The change signal DCG may make a transition to a low state at time point t3. The pixel signal SIG may be an analog signal corresponding to a high conversion gain from time point t3 to time point t13, that is, a period in which the change signal DCG is in a low state. A capacitance value corresponding to the conversion gain of the pixel may be decreased at time point t3. With the decrease in the capacitance value, a voltage drop in which the voltage of the pixel signal decreases may occur. The voltage of the first input terminal N1 may also drop as the voltage of the pixel signal SIG decreases. The third switch S3 may be maintained in a closed state until time point t3. By operating the third switch S3, the ramp signal RAMP may be applied to the second input terminal N2 until time point t3. The second capacitor C2 may store the voltage of the second input terminal N2.

Although the conversion gain of the pixel signal SIG increases at time point t3 and then the voltage of the pixel signal SIG decreases, the ramp signal RAMP does not change based on the conversion gain, and thus, accuracy may be decreased when the pixel signal SIG corresponding to a high conversion gain is converted into a digital signal. In an embodiment of the present disclosure, the operational amplifier may change the polarities of the first input terminal N1 and the second input terminal N2, thus changing the voltage stored in the second capacitor C2 based on the change in the conversion gain.

The inverse signal INV may be maintained at a high value from time point t4 to time point t6, and the second switch S2 may be maintained in a closed state from time point t4 to time point t5. In response to the inverse signal INV corresponding to a high state, the operational amplifier may set the polarity of first input terminal N1 to a positive polarity and may set the polarity of the second input terminal N2 to a negative polarity. The operational amplifier may receive the pixel signal SIG through the first input terminal N1 and may feed the output signal back into the second input terminal N2 from time point t4 to time point t5 based on the operation of the second switch S2. The second capacitor C2 may store the voltage of the second input terminal N2. The second capacitor C2 may store the dropped voltage of the first input terminal N1 based on the change in the conversion gain. The voltages of the first input terminal N1 and the second input terminal N2 may be equal to each other after time point t5.

The ramp signal RAMP may have the first ramp waveform from time point t7 to time point t8. The first ramp waveform may be a ramp waveform corresponding to the reset signal of the pixel signal SIG. The counter may convert the pixel signal SIG corresponding to a high conversion gain into a second conversion value by quantizing the pixel signal SIG from time point t7 to time point t8 based on the output of the operational amplifier. The second conversion value may be a digital signal obtained by converting the reset signal having a high conversion gain. The signal transducer 130 may convert the pixel signal SIG into the second conversion value based on the first ramp waveform.

The transmission signal TX may be in a high state from time point t9 to time point t10. In response to the transmission signal TX corresponding to the high state, photocharges generated by the photodetector may be transmitted to the storage capacitor. Due to the photocharges stored in the storage capacitor, the voltages of the pixel signal SIG and the first input terminal N1 may be decreased.

The ramp signal RAMP may have a second ramp waveform from time point t11 to time point t12. The second ramp waveform may be a ramp waveform corresponding to the normal signal of the pixel signal SIG. The magnitude of the second ramp waveform may be larger than that of the first ramp waveform. The counter may convert the pixel signal SIG corresponding to a high conversion gain into a third conversion value by quantizing the pixel signal SIG from time point t11 to time point t12 based on the output of the operational amplifier. The third conversion value may be a digital signal obtained by converting the normal signal having a high conversion gain. The signal transducer 130 may convert the pixel signal SIG into the third conversion value based on the second ramp waveform. The pixel value corresponding to a high conversion gain may be generated by subtracting the second conversion value from the third conversion value.

The change signal DCG may be in a high state after time point t13. In response to the change signal DCG, the conversion gain of the pixel signal SIG may be changed to a low conversion gain. The transmission signal TX may be in a high state from time point t13 to time point t14. In response to the transmission signal TX corresponding to the high state, photocharges generated by the photodetector may be transmitted to the storage capacitor. Because the capacitance value of the storage capacitor is increased, the voltages of the pixel signal SIG and the first input terminal N1 may be increased.

The third switch S3 may be maintained in a closed state after time point t13. By means of the operation of the third switch S3, the ramp signal RAMP may be applied to the second input terminal N2. The second capacitor C2 may store the voltage of the second input terminal N2. The voltage stored in the second capacitor C2 may be a voltage recovered based on a low conversion gain rather than a voltage dropped based on a high conversion gain.

The ramp signal RAMP may have a second ramp waveform from time point t15 to time point t16. The second ramp waveform may be a ramp waveform corresponding to the normal signal of the pixel signal SIG. The counter may convert the pixel signal SIG corresponding to a low conversion gain into a fourth conversion value by quantizing the pixel signal SIG from time point t15 to time point t16 based on the output of the operational amplifier. The fourth conversion value may be a digital signal obtained by converting the normal signal having a low conversion gain. The signal transducer 130 may convert the pixel signal SIG into the fourth conversion value based on the second ramp waveform. The pixel value corresponding to a low conversion gain may be generated by subtracting the first conversion value from the fourth conversion value.

Figure 5:
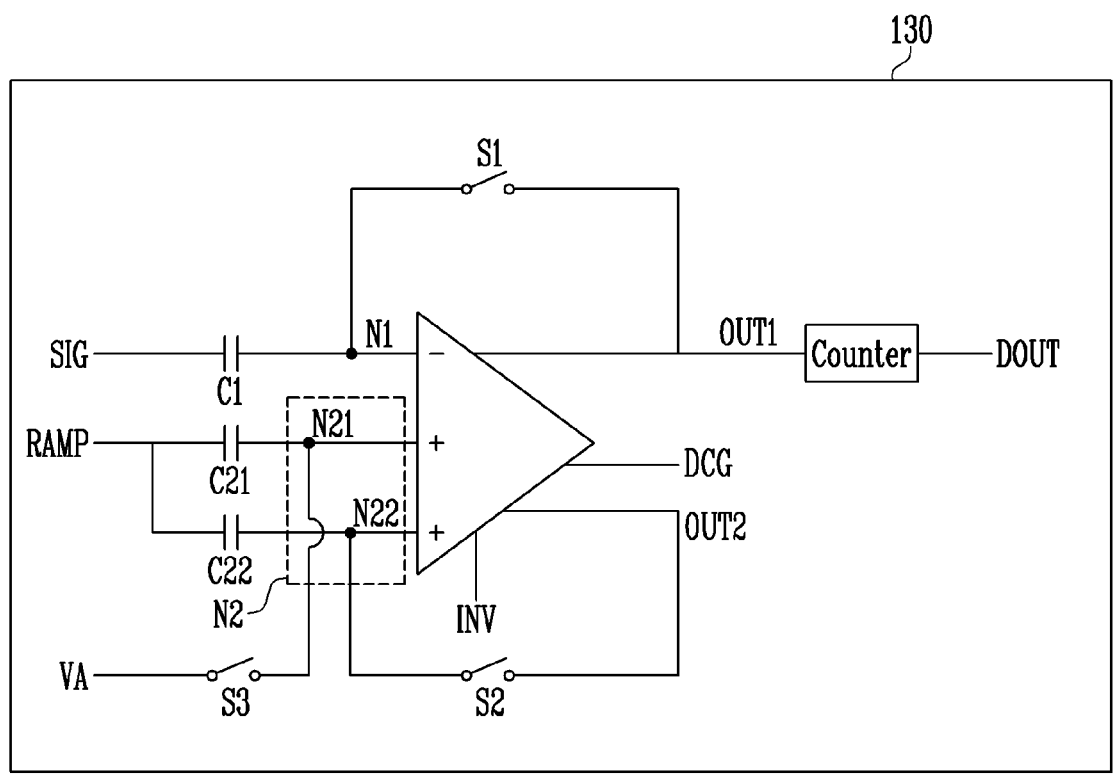
FIG. 5 is a circuit diagram illustrating a signal transducer according to an embodiment of the present disclosure.

FIG. 5 is a circuit diagram illustrating a signal transducer according to an embodiment of the present disclosure.

Referring to FIG. 5, the signal transducer 130 may compare a pixel signal with a ramp signal and then may convert a result signal into a digital signal. The signal transducer 130 may include an operational amplifier, capacitors that store the voltages of input terminals of the operational amplifier, switches that control signals to be applied to the input terminals of the operational amplifier, and a counter. The counter may convert a signal, received from a first output terminal OUT1 of the operational amplifier, into a digital signal. The signal transducer 130 may convert the output signal SIG of a pixel, which is an analog signal, into a digital signal, and then may output the digital signal. The output of the signal transducer 130 may be output through a terminal DOUT.

The operational amplifier may compare signals received through a first input terminal N1 and a second input terminal N2 with each other, and then may output a result signal through a first output terminal OUT1 or a second output terminal OUT2. In an embodiment of the present disclosure, the first input terminal N1 may be coupled to the first output terminal OUT1 through a first switch S1. When the first switch S1 is in a closed state, the output signal of the first output terminal OUT1 may be fed back into the first input terminal N1. When the first switch S1 is in an open state, the first output terminal may output a pixel value obtained by converting the pixel signal into a digital signal. The first input terminal N1 may receive the output signal (pixel signal) SIG through a first capacitor C1. The first capacitor C1 may store the voltage of the first input terminal N1.

The second input terminal N2 may be coupled to a first path coupled to a third capacitor C21 that receives the ramp signal RAMP or may be coupled to a second path coupled to a fourth capacitor C22 that receives the ramp signal RAMP. The operational amplifier may receive a change signal DCG from a control circuit. The operational amplifier may determine whether the first path or the second path is to be activated based on the change signal DCG. In an embodiment of the present disclosure, when the change signal DCG indicates a low conversion gain, the first path may be activated, and the second path may be deactivated. On the other hand, when the change signal DCG indicates a high conversion gain, the second path may be activated, and the first path may be deactivated.

The second input terminal N2 may be coupled to the first path through a first temporary node N21. The second input terminal N2 may be coupled to the second path through a second temporary node N22. The first path and the second path may have a complementary relation, and thus, the first path and the second path cannot be simultaneously activated.

A constant voltage VA may be applied to the first temporary node N21 through the third switch S3. When the first path is in an active state, and the third switch S3 is in a closed state, the constant voltage VA may be applied to the second input terminal N2. In an embodiment of the present disclosure, the constant voltage VA may be a reset voltage for the operational amplifier. The reset voltage for the operational amplifier may be an offset voltage corresponding to the ramp signal RAMP. The third capacitor C21 may store the voltage of the first temporary node N21. In an embodiment of the present disclosure, the third capacitor C21 may store a first offset voltage corresponding to a low conversion gain.

The second temporary node N22 may be coupled to the second output terminal OUT2 through the second switch S2. When the second path is in an active state and the second switch S2 is in a closed state, the voltage of the second output terminal OUT2 may be applied to the second input terminal N2. The fourth capacitor C22 may store the voltage of the second temporary node N22. In an embodiment of the present disclosure, the fourth capacitor C22 may store a second offset voltage corresponding to a high conversion gain.

The operational amplifier may change the polarities of the first input terminal N1 and the second input terminal N2 based on an inverse signal INV. Description of the change in the polarities of the operational amplifier, the inverse signal INV, and control signals for controlling the switches included in the signal transducer 130 may correspond to that of the operational amplifier of FIG. 3.

Figure 6:
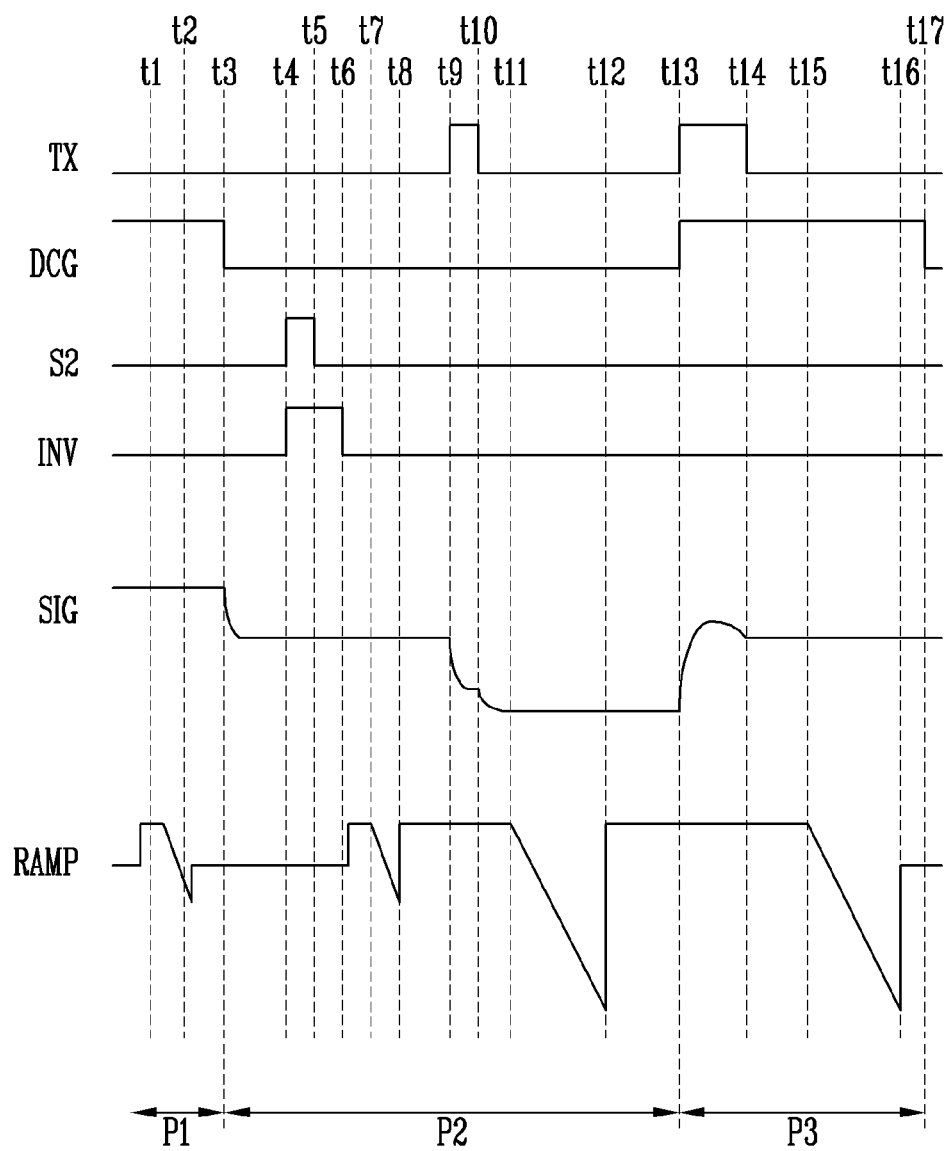
FIG. 6 is a timing diagram illustrating a signal conversion process according to an embodiment of the present disclosure.

FIG. 6 is a timing diagram illustrating a signal conversion process according to an embodiment of the present disclosure.

Referring to FIG. 6, the signal transducer 130 may convert a pixel signal into a digital signal based on a ramp signal. FIG. 6 illustrates the control signals, the pixel signal SIG, and the ramp signal RAMP that are applied to the signal transducer 130 of FIG. 5. In FIG. 6, it may be assumed that, before time point t1, the operational amplifier is reset. The first capacitor C1 may store an offset voltage corresponding to the ramp signal RAMP.

In FIG. 6, a first period P1 may be a period from time point t1 to time point t3, and a third period P3 may be a period from time point t13 to time point t17. The first period P1 and the third period P3 may indicate periods during which the change signal DCG is in a high state. During the first period P1 and the third period P3, the first path may be activated, and the second path may be deactivated. A second period P2 may be a period from time point t3 to time point t13. The second period P2 may be a period during which the change signal DCG is in a low state. During the second period P2, the second path may be activated, and the first path may be deactivated.

Because the change signal DCG is in a high state before time point t1, the conversion gain of the pixel signal SIG may be a low conversion gain. Since the inverse signal INV is in a low state, the first input terminal N1 may be a negative terminal, and the second input terminal N2 may be a positive terminal.

The voltage of the first input terminal N1 may be determined by the pixel signal SIG and a voltage stored in the first capacitor C1. During the first period P1, only the first path is activated, and thus, the voltage of the first temporary node N21 may be applied to the second input terminal N2.

The ramp signal RAMP may have a first ramp waveform from time point t1 to time point t2. The first ramp waveform may be a ramp waveform corresponding to the reset signal of the pixel signal SIG. The counter may convert the pixel signal SIG corresponding to a low conversion gain into a first conversion value by quantizing the pixel signal SIG from time point t1 to time point t2 based on the output of the operational amplifier. The first conversion value may be a digital signal obtained by converting a reset signal having a low conversion gain. The signal transducer 130 may convert the pixel signal SIG into the first conversion value based on the first ramp waveform.

The ramp signal RAMP may be maintained at an initial level from time point t2 to time point t6. Since the change signal DCG makes a transition to a low state at time point t3, the first path may be deactivated, and the second path may be activated. Since the second path is activated, the voltage of the second temporary node N22 may be applied to the second input terminal N2.

The pixel signal SIG may be an analog signal corresponding to a high conversion gain during the second period P2 in which the change signal DCG is in a low state. A capacitance value corresponding to the conversion gain of the pixel may be decreased at time point t3. With the decrease in the capacitance value, a voltage drop in which the voltage of the pixel signal is decreased may occur. The voltage of the first input terminal N1 may also drop as the voltage of the pixel signal SIG is decreased. The first capacitor C1 may store the dropped voltage of the first input terminal N1.

The inverse signal INV may be maintained at a high value from time point t4 to time point t6, and the second switch S2 may be maintained in a closed state from time point t4 to time point t5. In response to the inverse signal INV corresponding to a high state, the operational amplifier may set the polarity of first input terminal N1 to a positive polarity and may set the polarity of the second input terminal N2 to a negative polarity. The operational amplifier may receive the pixel signal SIG through the first input terminal N1 and may feed the output signal back into the second input terminal N2 from time point t4 to time point t5 based on the operation of the second switch S2. The second capacitor C22 may store the voltage of the second input terminal N2. The second capacitor C22 may store the dropped voltage of the first input terminal N1 based on the change in the conversion gain.

In an embodiment of the present disclosure, the third capacitor C21 may store the first offset voltage corresponding to the constant voltage VA, and the first offset voltage stored in the third capacitor C21 may be used to control the potential of the ramp signal RAMP used to convert the pixel signal SIG corresponding to a low conversion gain into a digital signal. The fourth capacitor C22 may store the second offset voltage corresponding to the voltage of the pixel signal SIG dropped with the increase in the conversion gain, and the second offset voltage may be used to control the potential of the ramp signal RAMP used to convert the pixel signal SIG corresponding to a high conversion gain into a digital signal. The operational amplifier may determine whether the paths coupled to the second input terminal N2 are to be activated based on the conversion gain of the pixel signal SIG.

The ramp signal RAMP may have the first ramp waveform from time point t7 to time point t8. The first ramp waveform may be a ramp waveform corresponding to the reset signal of the pixel signal SIG. The counter may convert the pixel signal SIG corresponding to a high conversion gain into a second conversion value by quantizing the pixel signal SIG from time point t7 to time point t8 based on the output of the operational amplifier. The second conversion value may be a digital signal obtained by converting a reset signal having a high conversion gain. The signal transducer 130 may convert the pixel signal SIG into the second conversion value based on the first ramp waveform.

The transmission signal TX may be in a high state from time point t9 to time point t10. In response to the transmission signal TX corresponding to the high state, photocharges generated by the photodetector may be transmitted to the storage capacitor. Due to the photocharges stored in the storage capacitor, the voltages of the pixel signal SIG and the first input terminal N1 may be decreased.

The ramp signal RAMP may have a second ramp waveform from time point t11 to time point t12. The second ramp waveform may be a ramp waveform corresponding to the normal signal of the pixel signal SIG. The magnitude of the second ramp waveform may be larger than that of the first ramp waveform. The counter may convert the pixel signal SIG corresponding to a high conversion gain into a third conversion value by quantizing the pixel signal SIG from time point t11 to time point t12 based on the output of the operational amplifier. The third conversion value may be a digital signal obtained by converting the normal signal having a high conversion gain. The signal transducer 130 may convert the pixel signal SIG into the third conversion value based on the second ramp waveform. The pixel value corresponding to a high conversion gain may be generated by subtracting the second conversion value from the third conversion value.

The change signal DCG may be in a high state after time point t13. Since the change signal DCG makes a transition to a high state at time point t13, the second path may be deactivated, and the first path may be activated again. Since the first path is activated, the voltage of the first temporary node N21 may be applied to the second input terminal N2. In an embodiment of the present disclosure, the voltage applied to the second input terminal N2 may be determined based on the voltage stored in the third capacitor C21 and the voltage of the ramp signal RAMP.

In response to the change signal DCG, the conversion gain of the pixel signal SIG may be changed to a low conversion gain. The transmission signal TX may be in a high state from time point t13 to time point t14. In response to the transmission signal TX corresponding to the high state, photocharges generated by the photodetector may be transmitted to the storage capacitor. Because the capacitance value of the storage capacitor is increased, the voltages of the pixel signal SIG and the first input terminal N1 may be increased.

The ramp signal RAMP may have a second ramp waveform from time point t15 to time point t16. The second ramp waveform may be a ramp waveform corresponding to the normal signal of the pixel signal SIG. The counter may convert the pixel signal SIG corresponding to a low conversion gain into a fourth conversion value by quantizing the pixel signal SIG from time point t15 to time point t16 based on the output of the operational amplifier. The fourth conversion value may be a digital signal obtained by converting the normal signal having a low conversion gain. The signal transducer 130 may convert the pixel signal SIG into the fourth conversion value based on the second ramp waveform. The pixel value corresponding to a low conversion gain may be generated by subtracting the first conversion value from the fourth conversion value.

Figure 7:
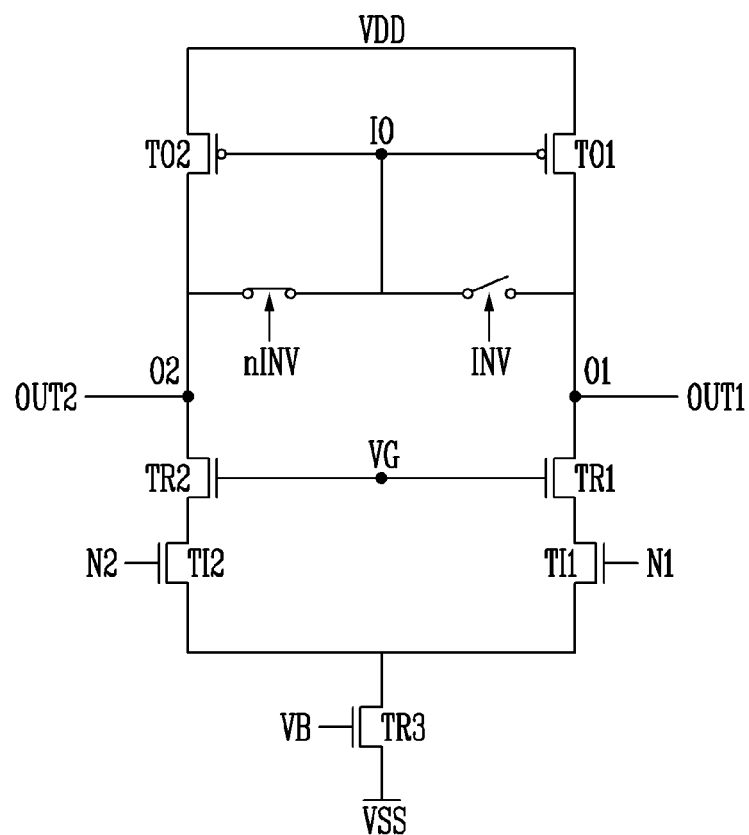
FIG. 7 is a circuit diagram illustrating an operational amplifier according to the embodiment of the present disclosure.

FIG. 7 is a circuit diagram illustrating an operational amplifier according to the embodiment of the present disclosure.

Referring to FIG. 7, the operational amplifier may include a current mirror circuit coupled to an output terminal and a switch circuit which transfers an output signal to one of output terminals based on an inverse signal INV. Based on the output terminals through which the output signal is to be output, the polarities of the input terminals of the operational amplifier may vary. In an embodiment of the present disclosure, voltage VDD and voltage VSS may be applied to the operational amplifier. The voltage VDD may be a constant voltage, and the voltage VSS may be a ground voltage. The voltage VSS may be applied through a third transistor TR3. The third transistor TR3 may be operated based on a voltage VB applied to a gate terminal thereof.

The operational amplifier may include a plurality of transistors. The operational amplifier may include two input transistors TI1 and TI2. A gate terminal of the first input transistor TI1 may be coupled to a first input terminal N1 of the operational amplifier. The first input transistor TI1 may be coupled, in cascade, to a first transistor TR1. The first transistor TR1 may be coupled to a first output terminal OUT1 of the operational amplifier. The first output terminal OUT1 may share a first output node O1 with the first transistor TR1, the current mirror circuit, and the switch circuit.

A gate terminal of the second input transistor TI2 may be coupled to a second input terminal N2 of the operational amplifier. The second input transistor TI2 may be coupled, in cascade, to a second transistor TR2. The second transistor TR2 may be coupled to a second output terminal OUT2 of the operational amplifier. The second output terminal OUT2 may share a second output node O2 with the second transistor TR2, the current mirror circuit, and the switch circuit.

The current mirror circuit may include two output transistors TO1 and TO2. The two output transistors TO1 and TO2 may be PMOS transistors. A first end of the first output transistor TO1 may be coupled to the first output terminal OUT1, and a second end of the first output transistor TO1 may be coupled to a first end of the second output transistor TO2. The voltage VDD may be applied to a node to which the first output transistor TO1 and the second output transistor TO2 are coupled. A gate terminal of the first output transistor TO1 may be coupled to a gate terminal of the second output transistor TO2. The gate terminals of the first output transistor TO1 and the second output transistor TO2 may be coupled to each other while sharing the first node IO. The current mirror circuit may output an output signal through the first node IO.

The switch circuit may include two switches. The operations of the switches included in the switch circuit may be opposite to each other. Specifically, when one switch is in a closed state, the other switch may be in an open state. The switches may be operated in response to an inverse signal INV and a non-inverse signal nINV. The non-inverse signal nINV may have a logic value that is different from the inverse signal INV. For example, when the inverse signal INV is in a high state, the non-inverse signal nINV may be in a low state.

The switch circuit may transfer the output signal applied through the first node IO to the first output node O1 or the second output node O2. When the inverse signal INV is in a low state, the switch circuit may transfer the output signal to the first output node O1, and the operational amplifier may output the output signal through the first output terminal OUT1. Here, the polarity of the first input terminal N1 of the operational amplifier may be a negative polarity, and the polarity of the second input terminal N2 may be a positive polarity.

The current mirror circuit may be coupled to the switch circuit. The switch to which the inverse signal INV is applied may be coupled to the switch to which the non-inverse signal nINV is applied through the first node IO. The switch to which the inverse signal INV is applied may be coupled to the first output transistor TO1, the first transistor TR1, and the first output terminal OUT1. The switch to which the non-inverse signal nINV is applied may be coupled to the second output transistor TO2, the second transistor TR2, and the second output terminal OUT2.

Gate terminals of the first transistor TR1 and the second transistor TR2 may be coupled to each other through a second node VG. The operational amplifier may include a gate voltage controller that controls a gate voltage to be applied to the first transistor TR1 and the second transistor TR2. The gate voltage controller may control the voltage that is applied to the second node VG.

The gate voltage controller may change an allowable range of input/output voltages of the operational amplifier by controlling the gate voltage of the first transistor TR1 and the second transistor TR2, which is applied to the second node VG. When the input/output voltages of the operational amplifier fall out of the allowable range, the operational amplifier might not be operated.

An operation maximum value for the input voltages of the operational amplifier and an operation minimum value for the output voltages of the operational amplifier may be determined by the gate voltage of the first transistor TR1 and the second transistor TR2. Because the polarities of the input terminals of the operational amplifier may be changed and the output terminals of the operational amplifier may be changed based on the inverse signal INV, the allowable range of input/output voltages may be adjusted for a normal operation of the operational amplifier.

The gate voltage controller may control the gate voltage so that a gate voltage lower than a gate voltage, provided when a pixel signal corresponding to a low conversion gain is input, is applied to the second node VG in response to the inverse signal INV corresponding to a high state. The gate voltage controller may control the gate voltage of the first transistor TR1 and the second transistor TR2 applied to the second node VG so that the input/output voltage of the operational amplifier falls within the operation allowable range even if the voltage of the first input terminal N1 decreases due to a voltage drop that occurs when the conversion gain of the pixel signal changes from a low conversion gain to a high conversion gain and the polarities of the first input terminal N1 and the second input terminal N2 are changed due to the inverse signal INV.

In an embodiment of the present disclosure, the gate voltage of the first transistor TR1 and the second transistor TR2 applied to the second node VG may be determined based on the magnitude of the voltage that is decreased due to a voltage drop attributable to the voltages of transistors included in the operational amplifier and a change in the conversion gain of the pixel signal.

Figure 8:
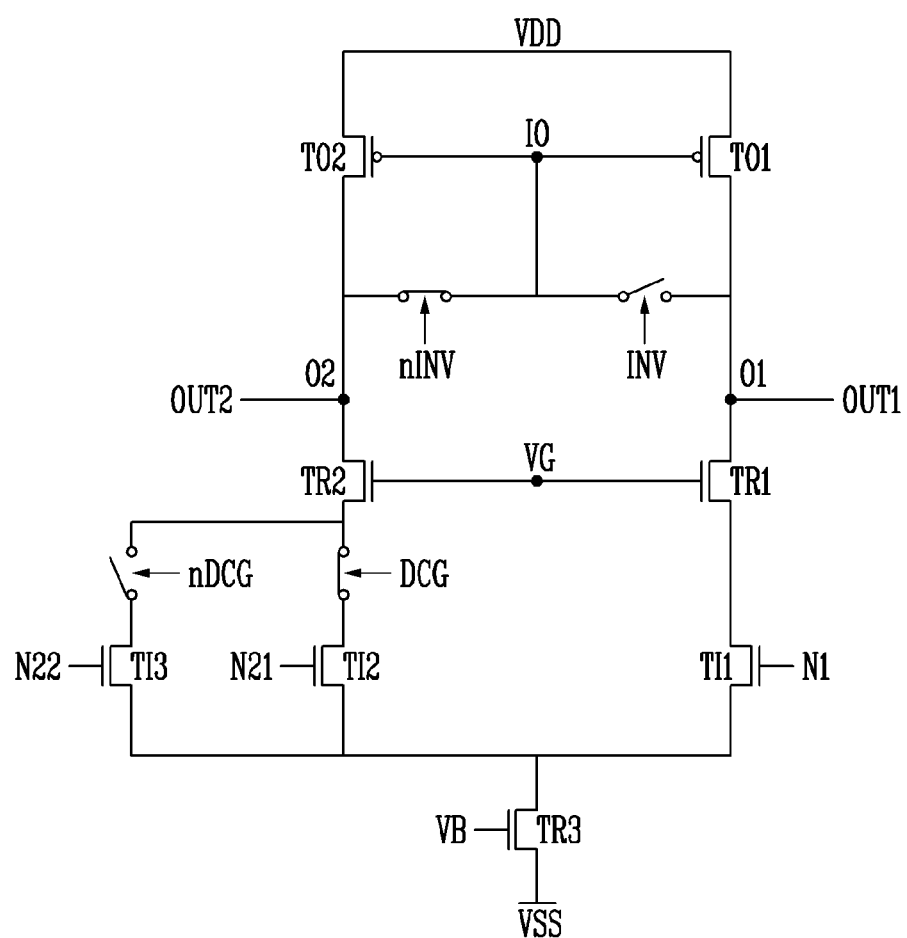
FIG. 8 is a circuit diagram illustrating an operational amplifier according to an embodiment of the present disclosure.

FIG. 8 is a circuit diagram illustrating an operational amplifier according to an embodiment of the present disclosure.

Referring to FIG. 8, an operational amplifier in which whether a first path or a second path of a second input terminal N2 is to be activated is determined in response to a change signal DCG may be illustrated. The components of the operational amplifier of FIG. 8 may be identical to those of the operational amplifier of FIG. 7, except for components for determining whether the first path or the second path of the second input terminal N2 is to be activated in response to the change signal DCG.

The operational amplifier may include a second input transistor TI2 and a third input transistor TI3. The second input transistor TI2 may be coupled, in cascade, to a switch to which the change signal DCG is applied. A gate terminal of the second input transistor TI2 may be coupled to a first temporary node N21. A third input transistor TI3 may be coupled, in cascade, to a switch to which a non-change signal nDCG is applied. A gate terminal of the third input transistor TI3 may be coupled to a second temporary node N22.

The change signal DCG and the non-change signal nDCG may have different logic values. For example, when the change signal DCG is in a high state, the non-change signal nDCG may be in a low state. When the change signal DCG is in a high state, the first path including the second input transistor TI2 may be activated, and the second path including the third input transistor TI3 may be deactivated.

Figure 9:
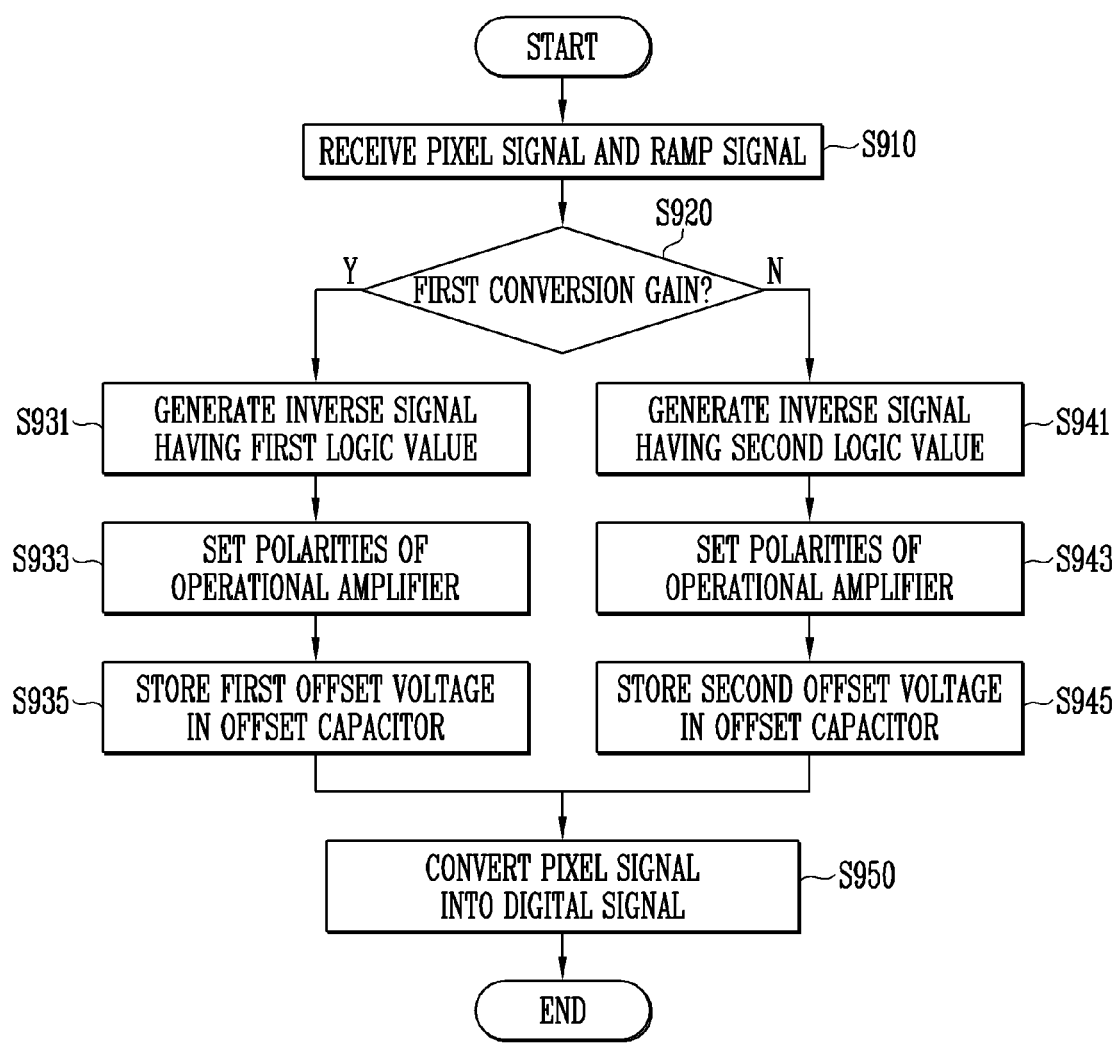
FIG. 9 is a flowchart illustrating a signal conversion method according to an embodiment of the present disclosure.

FIG. 9 is a flowchart illustrating a signal conversion method according to an embodiment of the present disclosure.

Referring to FIG. 9, a signal transducer included in an image sensor may convert an analog pixel signal into a digital pixel value. An operational amplifier included in the signal transducer may convert a pixel signal into a digital signal in response to a ramp signal used for signal conversion. The operational amplifier may convert a pixel signal into a digital signal in spite of a change in the conversion gain by changing the offset voltage of the ramp signal based on the conversion gain of the pixel signal.

At step S910, the signal transducer may receive the pixel signal and the ramp signal. A conversion gain related to analog-to-digital conversion may be changed for the pixel signal generated by each of pixels. The conversion gain of the pixel signal may be changed based on whether incident light on the image sensor has low illuminance. In an embodiment of the present disclosure, the pixels may generate pixel signals corresponding to a first conversion gain or a second conversion gain. The first conversion gain may be less than the second conversion gain. The first conversion gain may be a low conversion gain, and the second conversion gain may be a high conversion gain.

In an embodiment of the present disclosure, when the intensity of incident light on the pixels is weak, pixel signals corresponding to a high conversion gain may be output. Each pixel signal may be applied to the first input terminal of the operational amplifier. The ramp signal may be applied to the second input terminal of the operational amplifier.

At step S920, a signal manager included in the operational amplifier may determine the conversion gain of the received pixel signal. In an embodiment of the present disclosure, the signal manager may determine whether the conversion gain of the received pixel signal is the first conversion gain. When the conversion gain of the received pixel signal is the first conversion gain, the process may proceed to step S931. However, when the conversion gain of the received pixel signal is not the first conversion gain, the process may proceed to step S941. A logic value of an inverse signal to be subsequently generated and the offset voltage to be stored in an offset capacitor may vary based on the conversion gain of the pixel signal. Determination by the signal manager as to whether the conversion gain of the received pixel signal is the first conversion gain at step S920 is only an embodiment of the present disclosure, and the present disclosure is not limited thereto. For example, the signal manager may determine whether the conversion gain of the received pixel signal is the second conversion gain and may perform step S931 or S941 based on the result of the determination.

At step S931, the signal manager may generate an inverse signal having a first logic value in response to receiving the pixel signal corresponding to the first conversion gain. On the other hand, at step S941, the signal manager may generate an inverse signal having a second logic value in response to the second conversion gain. In an embodiment of the present disclosure, the first logic value may be at a high state, and the second logic value may be at a low state. The inverse signal may be transferred to the operational amplifier.

At step S933, the operational amplifier may determine the polarities of the input terminals of the operational amplifier based on the inverse signal having the first logic value. In an embodiment of the present disclosure, in response to receiving the inverse signal having the first logic value, the operational amplifier may set the polarity of the first input terminal to a negative polarity and the polarity of the second input terminal to a positive polarity.

Meanwhile, at step S943, the operational amplifier may determine the polarities of the input terminals of the operational amplifier based on the inverse signal having the second logic value. In response to receiving the inverse signal having the second logic value, the operational amplifier may set the polarity of the first input terminal to a positive polarity and may set the polarity of the second input terminal to a negative polarity.

Based on the polarities of the input terminals of the operational amplifier, an output terminal through which valid output is to be provided, among the output terminals of the operational amplifier, may be changed. The operational amplifier may output the pixel value through the first output terminal in response to receiving the inverse signal having the first logic value. In an embodiment of the present disclosure, the second output terminal of the operational amplifier may be activated in response to a case in which the operational amplifier receives the inverse signal having the second logic value. The second output terminal of the operational amplifier may be coupled only to the second input terminal and might not be coupled to a counter. The operational amplifier might not output a pixel value to the counter in response to receiving the inverse signal having the second logic value.

At step S935, the signal transducer may store the offset voltage determined based on the conversion gain of the pixel signal in an offset capacitor coupled to the second input terminal of the operational amplifier. In an embodiment of the present disclosure, the signal transducer may determine a first offset voltage based on the pixel signal corresponding to the first conversion gain. The signal transducer may store the first offset voltage in the offset capacitor.

On the other hand, at step S945, the signal transducer may determine a second offset voltage based on the voltage of the first input terminal dropped based on the pixel signal corresponding to the second conversion gain in response to a change from the first conversion gain to the second conversion gain. The signal transducer may store the second offset voltage in the offset capacitor.

The signal transducer may store the second offset voltage in the offset capacitor, and thereafter re-change the polarities of the operational amplifier. The signal transducer may reset the first input terminal to a negative terminal and reset the second input terminal to a positive terminal.

At step S950, the signal transducer may convert an analog pixel signal into a digital signal. The signal transducer may convert the pixel signal into the digital signal based on the offset voltage stored in the offset capacitor. The signal transducer may convert the pixel signal into the digital signal by quantizing the pixel signal in response to an application of a ramp waveform to the second input terminal. In an embodiment of the present disclosure, the central voltage of the ramp waveform applied to the second input terminal may vary based on the offset voltage.

The signal transducer may perform analog-to-digital signal conversion on the reset level of the pixel signal corresponding to the first conversion gain and then calculate a first conversion value. The signal transducer may perform analog-to-digital signal conversion on the reset level of the pixel signal for which the conversion gain changes to the second conversion gain and then calculate a second conversion value. Each pixel may output a normal pixel signal based on a transmission signal. The signal transducer may perform signal conversion on the normal pixel signal corresponding to the second conversion gain and then calculate a third conversion value. The signal transducer may perform signal conversion on a normal pixel signal for which the conversion gain changes to the first conversion gain and then may calculate a fourth conversion value. The signal transducer may calculate a pixel value corresponding to the first conversion gain by subtracting the first conversion value from the fourth conversion value. The signal transducer may calculate a pixel value corresponding to the second conversion gain by subtracting the second conversion value from the third conversion value.

A method of converting an analog pixel signal into a digital pixel value may correspond to the description of FIGS. 4 to 6.

Figure 10:
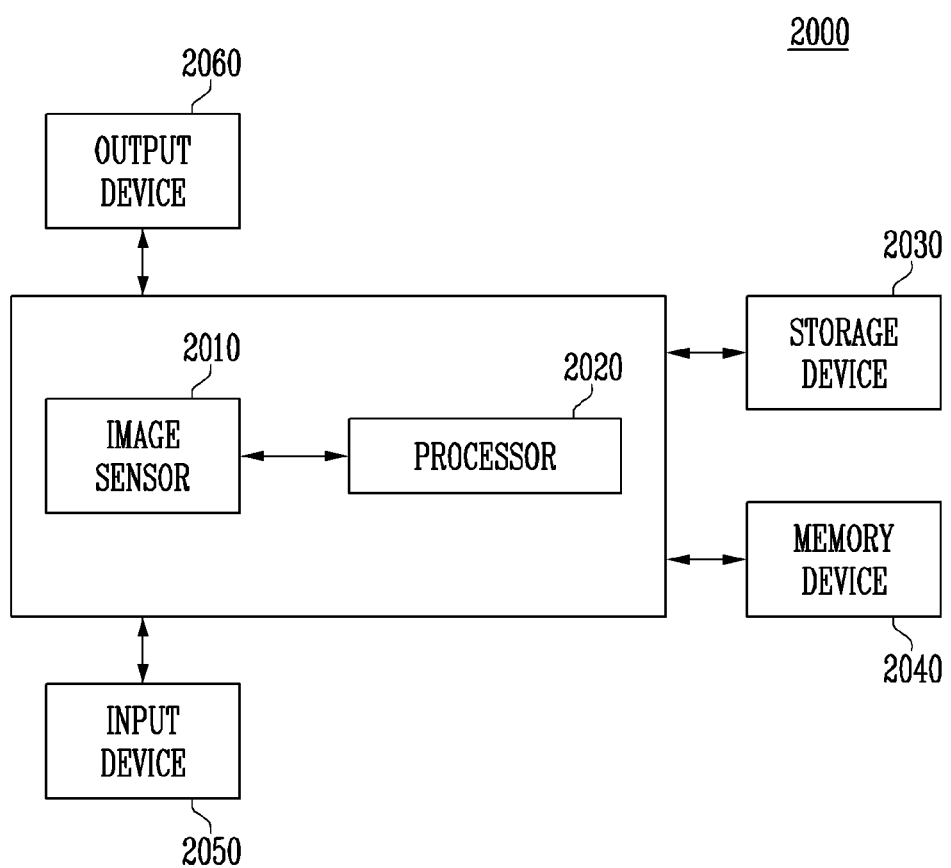
FIG. 10 is a block diagram illustrating an electronic device including an image sensor according to an embodiment of the present disclosure.

FIG. 10 is a block diagram illustrating an electronic device including an image sensor according to an embodiment of the present disclosure.

Referring to FIG. 10, an electronic device 2000 may include an image sensor 2010, a processor 2020, a storage device 2030, a memory device 2040, an input device 2050, and an output device 2060. Although not illustrated in FIG. 10, the electronic device 2000 may further include ports that are capable of communicating with a video card, a sound card, a memory card, or a USB device, or communicate with other electronic devices.

The image sensor 2010 may generate image data corresponding to the incident light. The image data may be transferred to and processed by the processor 2020. The image sensor 2010 may generate image data regarding an object that is input (or captured) through a lens. The lens may include at least one lens that forms an optical system.

The image sensor 2010 may include a plurality of pixels. The pixels may output pixel signals corresponding to a low conversion gain or a high conversion gain. The pixel signals output from the pixels may be analog signals. The image sensor 2010 may include an operational amplifier that changes the polarities of input terminals based on an inverse signal. The operational amplifier may output a comparison signal obtained by comparing a ramp signal used for signal conversion with each pixel signal. A counter included in the image sensor 2010 may convert the pixel signal into a digital signal based on the output of the operational amplifier. The image sensor 2010 may include a signal manager that generates the inverse signal when the conversion gain of the pixel signal is changed. The operational amplifier may store an offset voltage determined based on the conversion gain of the pixel signal in capacitors coupled to the input terminals of the operational amplifier.

The output device 2060 may display the image data. The storage device 2030 may store the image data. The processor 2020 may control the operations of the image sensor 2010, the output device 2060, and the storage device 2030.

The processor 2020 may be an image processing device that performs an operation of processing the image data received from the image sensor 2010 and outputs the processed image data. Here, processing may include electronic image stabilization (EIS), interpolation, tonal correction, image quality correction, size adjustment, etc.

The processor 2020 may be implemented as a chip independent of the image sensor 2010. For example, the processor 2020 may be implemented as a multi-chip package. In an embodiment of the present disclosure, the processor 2020 and the image sensor 2010 may be integrated into a single chip so that the processor 2020 is included as a part of the image sensor 2010.

The processor 2020 may execute and control the operation of the electronic device 2000. In accordance with an embodiment of the present disclosure, the processor 2020 may be a microprocessor, a central processing unit (CPU), or an application processor (AP). The processor 2020 may be coupled to the storage device 2030, the memory device 2040, the input device 2050, and the output device 2060 through an address bus, a control bus, and a data bus, and then may communicate with the devices.

The storage device 2030 may include all types of nonvolatile memory devices including a flash memory device, a solid state drive (SSD), a hard disk drive (HDD), and a CD-ROM.

The memory device 2040 may store data required for the operation of the electronic device 2000. For example, the memory device 2040 may include a volatile memory device, such as a dynamic random access memory (DRAM) or a static random access memory (SRAM), and a nonvolatile memory device, such as an erasable programmable read-only memory (EPROM), an electrically erasable programmable read-only memory (EEPROM), or a flash memory device. The processor 2020 may control the image sensor 2010 and the output device 2060 by executing an instruction set stored in the memory device 2040.

The input device 2050 may include an input means, such as a keyboard, a keypad, or a mouse, and the output device 2060 may include an output means such as a printer or a display.

The image sensor 2010 may be implemented as various types of packages. For example, at least some components of the image sensor 2010 may be implemented using any of packages, such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

Meanwhile, the electronic device 2000 may be construed as any computing system using the image sensor 2010. The electronic device 2000 may be implemented in the form of a packaged module, a part, or the like. For example, the electronic device 2000 may be implemented as a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

In accordance with the present disclosure, there may be provided an image sensor, which stores an offset voltage corresponding to a conversion gain of a pixel signal, and then converts a pixel signal corresponding to a low conversion gain or a high conversion gain into a digital signal using a single signal transducer.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure.

What is claimed is:

1. A signal transducer, comprising:
   an operational amplifier configured to receive a pixel signal, a conversion gain of which is changed, through a first input terminal, receive a ramp signal through a second input terminal, and change polarities of the first input terminal and the second input terminal based on an inverse signal; and
   a signal manager configured to generate the inverse signal in response to a change in the conversion gain and transfer the inverse signal to the operational amplifier,
   wherein the operational amplifier comprises:
      a gate voltage controller configured to control a gate voltage provided to a first node to which gate terminals of a first transistor and a second transistor are coupled in response to an increase in the conversion gain,
   wherein the first transistor is coupled, in cascade, to a first input transistor having a gate terminal coupled to the first input terminal, and the second transistor is coupled, in cascade, to a second input transistor having a gate terminal coupled to the second input terminal.

2. The signal transducer according to claim 1, further comprising:
   a first capacitor configured to store a voltage of the first input terminal;
   a second capacitor configured to store a voltage of the second input terminal;
   a first switch configured to couple a first output terminal and the first input terminal of the operational amplifier to each other; and
   a second switch configured to couple a second output terminal and the second input terminal of the operational amplifier to each other.

3. The signal transducer according to claim 2,
   wherein the signal manager generates a reset signal for controlling the first switch, and
   wherein the first capacitor stores an offset voltage corresponding to the ramp signal based on an operation of the first switch.

4. The signal transducer according to claim 3,
   wherein the operational amplifier converts a pixel signal corresponding to a low conversion gain into a digital signal based on the offset voltage and the ramp signal.

5. The signal transducer according to claim 2,
   wherein an intensity of the pixel signal decreases in response to the increase in the conversion gain, and
   wherein the first capacitor stores a dropped voltage of the first input terminal in response to a decrease in the intensity of the pixel signal.

6. The signal transducer according to claim 5,
   wherein the signal manager generates a drop signal for controlling the inverse signal and the second switch in response to the increase in the conversion gain.

7. The signal transducer according to claim 6,
   wherein the operational amplifier changes voltages such that the dropped voltage of the first input terminal is equal to the voltage of the second input terminal in response to the inverse signal, and
   wherein the second capacitor stores the voltage of the second input terminal, equal to the dropped voltage of the first input terminal, based on an operation of the second switch.

8. The signal transducer according to claim 7,
   wherein the operational amplifier converts a pixel signal corresponding to a high conversion gain into a digital signal based on a ramp signal dropped based on the voltage of the second capacitor.

9. The signal transducer according to claim 2, wherein the operational amplifier further comprises:
   a current mirror circuit configured to output an output signal to a second node to which gate terminals of a first output transistor coupled to the first output terminal and a second output transistor coupled to the second output terminal are coupled; and
   a switch circuit configured to transfer the output signal to the first output terminal or the second output terminal based on the inverse signal.

10. The signal transducer according to claim 1,
    wherein the gate voltage controller provides a voltage lower than a gate voltage, provided when a pixel signal corresponding to a low conversion gain is input, to the first node in response to the inverse signal corresponding to a high state.

11. The signal transducer according to claim 9, wherein the switch circuit transfers the output signal to the second output terminal in response to the inverse signal corresponding to a high state.

12. The signal transducer according to claim 11,
    wherein the operational amplifier outputs the voltage of the first input terminal to the second output terminal in response to a closed state of the second switch, and
    wherein the voltage of the second input terminal is changed to be equal to the voltage of the first input terminal.

13. The signal transducer according to claim 9,
    wherein the switch circuit transfers the output signal to the first output terminal in response to the inverse signal corresponding to a low state.

14. The signal transducer according to claim 13,
    wherein the operational amplifier converts the pixel signal into a digital signal in response to the ramp signal input to the second input terminal and outputs the digital signal to the first output terminal.

15. The signal transducer according to claim 1,
    wherein the second input terminal receives the ramp signal through a first path coupled to a third capacitor configured to receive the ramp signal or a second path coupled to a fourth capacitor configured to receive the ramp signal.

16. The signal transducer according to claim 15,
    wherein the operational amplifier determines whether the first path or the second path is to be activated based on the conversion gain.

17. The signal transducer according to claim 16,
wherein the operational amplifier activates the first path and deactivates the second path in response to a low conversion gain of the pixel signal.

18. The signal transducer according to claim 17,
wherein the third capacitor stores a first offset voltage corresponding to the low conversion gain, and
wherein the operational amplifier converts a pixel signal corresponding to the low conversion gain into a digital signal based on the first offset voltage.

19. The signal transducer according to claim 16,
wherein the operational amplifier deactivates the first path and activates the second path in response to a high conversion gain of the pixel signal.

20. The signal transducer according to claim 19,
wherein the fourth capacitor stores a second offset voltage corresponding to the high conversion gain, and
wherein the operational amplifier converts a pixel signal corresponding to the high conversion gain into a digital signal based on the second offset voltage.

21. The signal transducer according to claim 20,
wherein the second offset voltage is determined based on a dropped voltage of the first input terminal in response to the inverse signal.

22. An image sensor, comprising:
pixels configured to output pixel signals corresponding to a first conversion gain or a second conversion gain;
a signal transducer configured to convert each of the pixel signals into a digital signal based on a ramp signal used for signal conversion; and
a control circuit configured to generate the ramp signal,
wherein the signal transducer receives the pixel signal through a first input terminal, receives the ramp signal through a second input terminal, and changes polarities of the first input terminal and the second input terminal based on an inverse signal,
wherein the control circuit generates the inverse signal in response to a change in a conversion gain of the pixel signal from the first conversion gain to the second conversion gain and transfers the inverse signal to an operational amplifier included in the signal transducer, and
wherein the operational amplifier controls a gate voltage provided to a first node to which gate terminals of a first transistor and a second transistor are coupled in response to an increase in the conversion gain,
wherein the first transistor is coupled, in cascade, to a first input transistor having a gate terminal coupled to the first input terminal, and the second transistor is coupled, in cascade, to a second input transistor having a gate terminal coupled to the second input terminal.

23. The image sensor according to claim 22, wherein the operational amplifier comprises:
a first capacitor configured to store a voltage of the first input terminal; and
a second capacitor configured to store a voltage of the second input terminal.

24. The image sensor according to claim 23,
wherein the first conversion gain is less than the second conversion gain,
wherein the first capacitor stores an offset voltage corresponding to the ramp signal, and
wherein the second capacitor stores an offset voltage determined based on the pixel signal.

25. The image sensor according to claim 24,
wherein the second capacitor stores a first offset voltage determined based on the first conversion gain, and
wherein the operational amplifier converts a pixel signal corresponding to the first conversion gain into a digital signal based on the first offset voltage.

26. The image sensor according to claim 24,
wherein the operational amplifier sets the first input terminal to a positive terminal and sets the second input terminal to a negative terminal in response to the inverse signal corresponding to a high state, and
wherein the voltage of the first input terminal is dropped in response to receiving a pixel signal corresponding to the second conversion gain.

27. The image sensor according to claim 26,
wherein the second capacitor stores a second offset voltage determined based on the dropped voltage of the first input terminal, and
wherein the operational amplifier sets the first input terminal to a negative terminal and sets the second input terminal to a positive terminal in response to the inverse signal corresponding to a low state.

28. The image sensor according to claim 27,
wherein the operational amplifier converts a pixel signal corresponding to the second conversion gain into a digital signal based on the second offset voltage.

* * * * *